No. 770,896. PATENTED SEPT. 27, 1904.
C. G. FAWKES.
MOLD FOR TIRES.
APPLICATION FILED SEPT. 19, 1903.
NO MODEL.

Witnesses
Otto E. Hoddick.
Dena Nelson.

C. G. Fawkes.
Inventor

By H. J. S. ———
Attorney

No. 770,896. Patented September 27, 1904.

UNITED STATES PATENT OFFICE.

CHARLES G. FAWKES, OF DENVER, COLORADO, ASSIGNOR TO THE FAWKES RUBBER COMPANY, OF DENVER, COLORADO.

MOLD FOR TIRES.

SPECIFICATION forming part of Letters Patent No. 770,896, dated September 27, 1904.

Application filed September 19, 1903. Serial No. 173,910. (No model.)

*To all whom it may concern:*

Be it known that I, CHARLES G. FAWKES, a citizen of the United States of America, residing in the city and county of Denver and State of Colorado, have invented certain new and useful Improvements in Molds for Tires; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in molds for tires, and is especially intended for use in the manufacture of cushion-tires or those composed of a tube and a core, filled or braced to support and prevent the collapse of the tube when subjected to pressure.

An important feature of my mold consists of pins or projections extending inwardly from the inner periphery of the mold and adapted to form external recesses on the inner periphery of the tire made therein and whereby the tire is held accurately during the process of manufacture or vulcanization. These recesses aid in securing the tire to the rim of the wheel, and the pins also by pressing the tire material inwardly form protuberances which separate and support the sides of the core in a special construction of tire and prevent the tendency to collapse or become crooked or twisted during the manufacture of the tire. The pins also take up the slack of the canvas fabric of the tire by pressing the latter inwardly into the hollow of the tire.

Having outlined my improved construction, as well as the objects I expect to obtain thereby, I will proceed to describe the same in detail, reference being made to the accompanying drawings, in which is illustrated an embodiment thereof.

Figure 1:
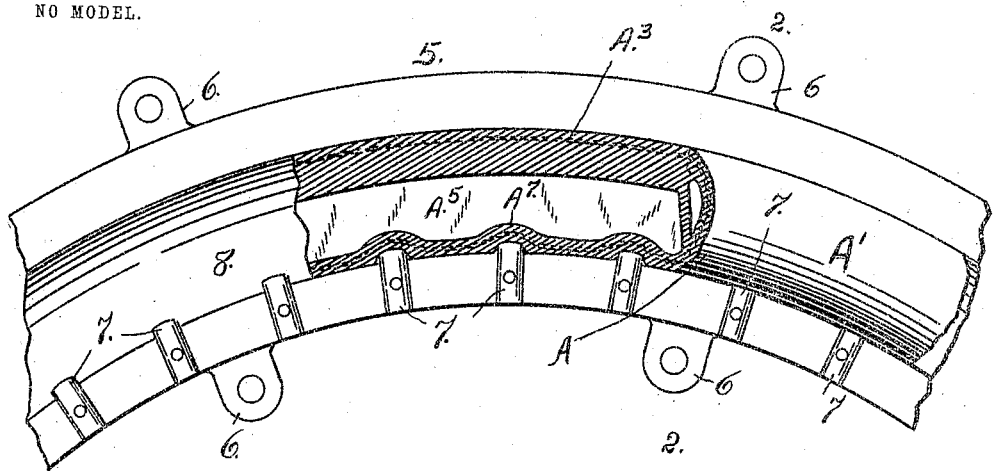
Figure 2:
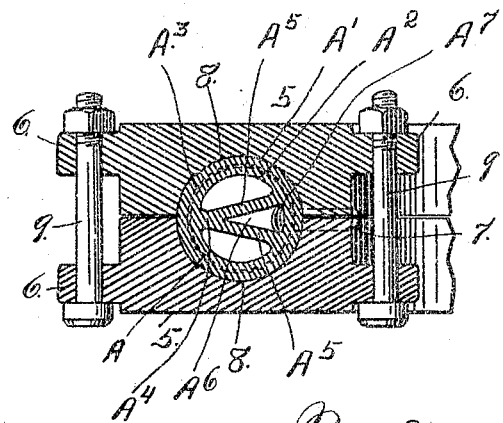

In the drawings, Figure 1 is a fragmentary view of one of the mold members, being the member provided with the pins or projections. In this view a part of the tire is shown in elevation and a part in section. Fig. 2 is a cross-section of the mold, showing the tire in place.

The same reference characters indicate the same parts in all the views.

Let the numeral 5 designate each of the two mold members. Each of these members is provided with lugs 6, through which are passed fastening-bolts 9 to hold the members in place during the operation of forming a tire. The lugs 6 project from both sides of the mold members. One of these mold members is provided with pins 7, whose inner extremities project into the hollow 8 of the tire, thus forming recesses in the latter during the operation of molding or vulcanization. It is evident that when the tire material is in place these pins will keep the said material in the proper position and make it impossible to form an imperfect tire. Without the pins great difficulty has been experienced in the manufacture of perfectly true tires; but by using the pins or projections on the inner periphery of the mold, as heretofore explained, this difficulty has been entirely overcome. Hence the importance of the invention.

In the drawings the form of tire shown in the mold is that covered by United States Letters Patent No. 682,977, dated September 17, 1901. This tire, which is designated in its entirety by the letter A, consists of a tube and a core. The tube is composed of outer and inner rubber parts $A'$ and $A^2$, respectively, and an intermediate canvas part $A^3$, while the core consists of a rib $A^4$, located adjacent the outer periphery of the tube, and two diverging side parts $A^5$, extending from the rib and the inner surface of the tube adjacent the inner periphery of the latter. Between these wings is a V-shaped space $A^6$, into which the protuberance $A^7$ extends when the tire is formed in a mold where the pins 7 are used. This protuberance prevents the tendency of the side parts $A^5$ of the core to collapse or become twisted during the formation of the tire. While this special construction of tire is shown in the drawings, it must be understood that my improved mold may be employed to equal advantage in the manufacture of other forms of tires and that I do not limit myself to the use of the mold in connection with the making of any particular form of tire.

Having thus described my invention, what I claim is—

1. A tire-mold provided with pins radially disposed and projecting from the inner periphery of the mold into the hollow of the latter.

2. A tire-mold composed of two members one of which is provided with pins or projections radially disposed and adapted to form recesses on the inner periphery of the tire formed or vulcanized therein.

3. A tire-mold composed of two twin parts and pins radially disposed with reference to the axis of the mold, said pins being connected with one of the parts and adapted to form external recesses on the inner periphery of the tire formed or vulcanized in the mold, the two mold members being provided with apertured lugs adapted to receive fastening devices for holding the two parts in operative relation.

4. A tire-mold provided with a radial projection formed on its inner periphery.

In testimony whereof I affix my signature in presence of two witnesses.

CHARLES G. FAWKES.

Witnesses:
   August Stahuke,
   William Yaisl.